(12) United States Patent
Abad

(10) Patent No.: US 11,014,174 B2
(45) Date of Patent: May 25, 2021

(54) MULTI-FLUTE END MILL

(71) Applicant: Hanita Metal Works Ltd., Shlomi (IL)

(72) Inventor: Roni Abad, Mi'ilya (IL)

(73) Assignee: HANITA METAL WORKS LTD, Shlomi (IL)

( * ) Notice: Subject to any disclaimer, the term of this patent is extended or adjusted under 35 U.S.C. 154(b) by 71 days.

(21) Appl. No.: 16/261,082

(22) Filed: Jan. 29, 2019

(65) Prior Publication Data

US 2019/0232395 A1 Aug. 1, 2019

(30) Foreign Application Priority Data

Feb. 1, 2018 (IL) .......................................... 257313

(51) Int. Cl.
*B23C 5/10* (2006.01)

(52) U.S. Cl.
CPC .............. *B23C 5/1018* (2013.01); *B23C 5/10* (2013.01); *B23C 5/1009* (2013.01); *B23C 2210/0485* (2013.01); *B23C 2210/287* (2013.01); *B23C 2210/325* (2013.01); *B23C 2210/40* (2013.01); *B23C 2220/16* (2013.01)

(58) Field of Classification Search
CPC .............. B23C 5/1018; B23C 5/1009; B23C 2210/287; B23C 2210/325; B23C 5/10
See application file for complete search history.

(56) References Cited

U.S. PATENT DOCUMENTS

| | | | |
|---|---|---|---|
| 2,294,192 A | 2/1884 | Bboadbent | |
| 2,344,954 A | 3/1944 | Aber | |
| 3,175,850 A | 3/1965 | Steczynski | |
| 4,632,610 A | 12/1986 | Hougen | |
| 5,685,671 A * | 11/1997 | Packer | B23C 5/1018 407/118 |
| 9,517,515 B2 | 12/2016 | Shpigelman | |

FOREIGN PATENT DOCUMENTS

| | | | |
|---|---|---|---|
| DE | 102015105216 A1 | 8/2019 | |
| JP | H0796413 A | 4/1995 | |
| JP | 2003039223 A * | 2/2003 | B23C 5/1009 |
| JP | 2006088278 A | 4/2006 | |
| JP | 2002126929 A | 11/2010 | |

OTHER PUBLICATIONS

English translation of JP 2003039223, Feb. 2003 (Year: 2003).*
Ravjeet Engineering, Chamfering & Deburring Cutter.
Sep. 11, 2019 Foreign OA.
May 26, 2019 Foreign OA.

* cited by examiner

*Primary Examiner* — Alan Snyder
(74) *Attorney, Agent, or Firm* — Larry R. Meenan

(57) ABSTRACT

Broadly contemplated herein, in accordance with at least one embodiment, is a multi-flute end mill configuration that maintains circumferential spacing between the rake surface and clearance surface adjoining two adjacent end face cutting edges, respectively, regardless of the number of flutes and the desired end face configuration.

12 Claims, 5 Drawing Sheets

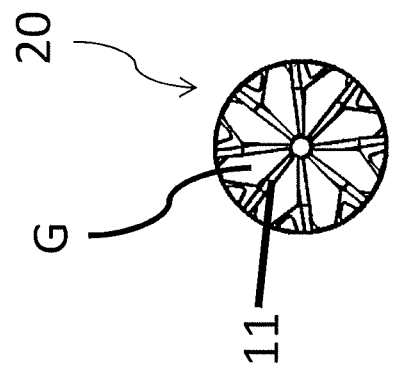
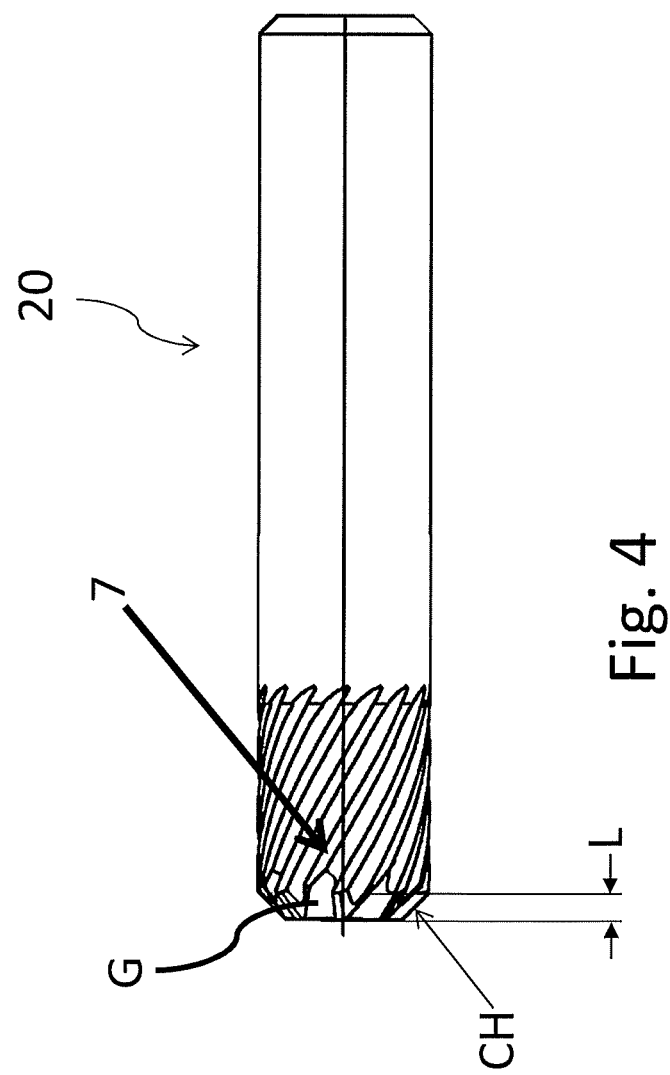
Fig. 4
Fig. 5

MULTI-FLUTE END MILL

RELATED APPLICATION DATA

The present application claims priority pursuant to 35 U.S.C. § 119(a) to Israeli Patent Application 257313 filed Feb. 1, 2018 which is incorporated herein by reference in its entirety.

FIELD

Embodiments of the invention, as broadly contemplated herein, relate to the field of industrial cutting tools, by which metal or other material is cut in a predetermined fashion. More particularly, embodiments of the invention, as broadly contemplated herein, relate to an improved multi-flute end mill that facilitates an increased chip removal rate for a given tool diameter, relative to prior art multi-flute end mills.

BACKGROUND

An end mill having both axial-end cutting edges and peripheral cutting edges is widely used for deep and high-speed machining, particularly slotting, in both the axial and sideways directions. A corner is produced in prior art end mills to merge each peripheral cutting edge with a corresponding end cutting edge.

End mills have helical flutes through which chips are evacuated after being cut from a workpiece. An end mill having a higher number of flutes, such as six or eight flutes, supports a higher feed rate of a workpiece to reduce machining time since less material is removed per flute. An increased number of cutting edges, both peripheral cutting edges and end face cutting edges, helps to improve tool stability to provide a better-quality work surface, facilitates an increased chip removal rate, and decreases noise generated by the end mill.

The workpiece can be machined with a desired contour, depending on the type of end face configuration that has been selected. The end face can include a square end to machine flat surfaces, or a ball-nosed end for milling up, down and along the contours of complex milled shapes (such as die and mold surfaces). Other end face configurations for an end mill include a corner radius configuration and a chamfer configuration.

Often, it is very difficult or even impossible to produce a desired end face configuration due to the large number of flutes that are provided with an end mill. As the peripheral cutting edges extend continuously to a corresponding end face cutting edge, albeit at a different angular position about the circumference of the end mill (viewed in a plane perpendicular to the longitudinal axis of the end mill) and thereby converge toward a central region of the end face, the circumferential spacing between adjacent end face cutting edges significantly decreases. Thus, the rake surface and clearance surface adjoining two adjacent end face cutting edges, respectively, can consequently contact each other due to the reduced circumferential spacing therebetween, reducing the overall effectiveness of the end face cutting edges and hindering the flow of chips through the flutes.

SUMMARY

Broadly contemplated herein is a multi-flute end mill, comprising a plurality of peripheral cutting edges that adjoin corresponding helical flutes. In accordance with one aspect of at least one embodiment, a multi-flute end mill comprises:

an end face;
a plurality of flutes which each extend helically from the end face along a generally axial direction of the end mill;
a plurality of peripheral cutting edges, each adjoining a corresponding one of the helical flutes, wherein two or more of the peripheral cutting edges are extended peripheral cutting edges; and
a plurality of end face cutting edges disposed at the end face,
wherein the flutes each define a similar flute helix angle profile,
wherein the number of the end face cutting edges is less than the number of the peripheral cutting edges, and
wherein a limited number of the peripheral cutting edges terminate at a predetermined axial distance from a reference region of the end face, while the extended peripheral cutting edges terminate at the end face.

According to one embodiment, a gash is interposed between a forward end of each of the terminated peripheral edges and the reference region of the end face. In another embodiment, each of the gashes extends circumferentially between two adjacent end face cutting edges and has a circumferential dimension, perpendicular to a longitudinal axis of the end mill, which is greater than a circumferential dimension of one or more of the flutes.

In another embodiment, the multi-flute end mill is a ballnose end mill that comprises a cutting head. Each of the gashes may thereby have a minimum axial length equal to the product of 0.4 and a radius of the ballnose cutting head. In one particular embodiment, each of the gashes has a maximum axial length that is greater than the radius of the ballnose cutting head.

Embodiments herein also encompass a multi-flute end mill which is a chamfered end mill that comprises a chamfered cutting head. Each of the gashes may thereby have a minimum axial length equal to the product of 0.4 and a chamfer length of the chamfered cutting head. In one specific embodiment, each of the gashes has a maximum axial length greater than the chamfer length of the chamfered cutting head.

In a further embodiment, the end mill is a corner-radius end mill that comprises a corner-radius cutting head. Each of the gashes may thereby have a minimum axial length equal to the product of 0.4 and a corner radial dimension of the corner-radius cutting head. According to a particular embodiment, each of the gashes has a maximum axial length greater than the corner radial dimension of the corner-radius cutting head.

In yet another embodiment, each of the gashes has a gash angle of between 10 and 60 degrees. Here, the minimum height of a side wall of each of the limited number of peripheral extended cutting edges, with respect to a corresponding one of the gashes, may be 0.10 mm.

BRIEF DESCRIPTION OF THE DRAWINGS

In the drawings:

FIG. 4 is a side view of a chamfered end mill, according to one embodiment;

FIG. 5 is a front view of the chamfered end mill of FIG. 4;

DETAILED DESCRIPTION

Figure 1A:
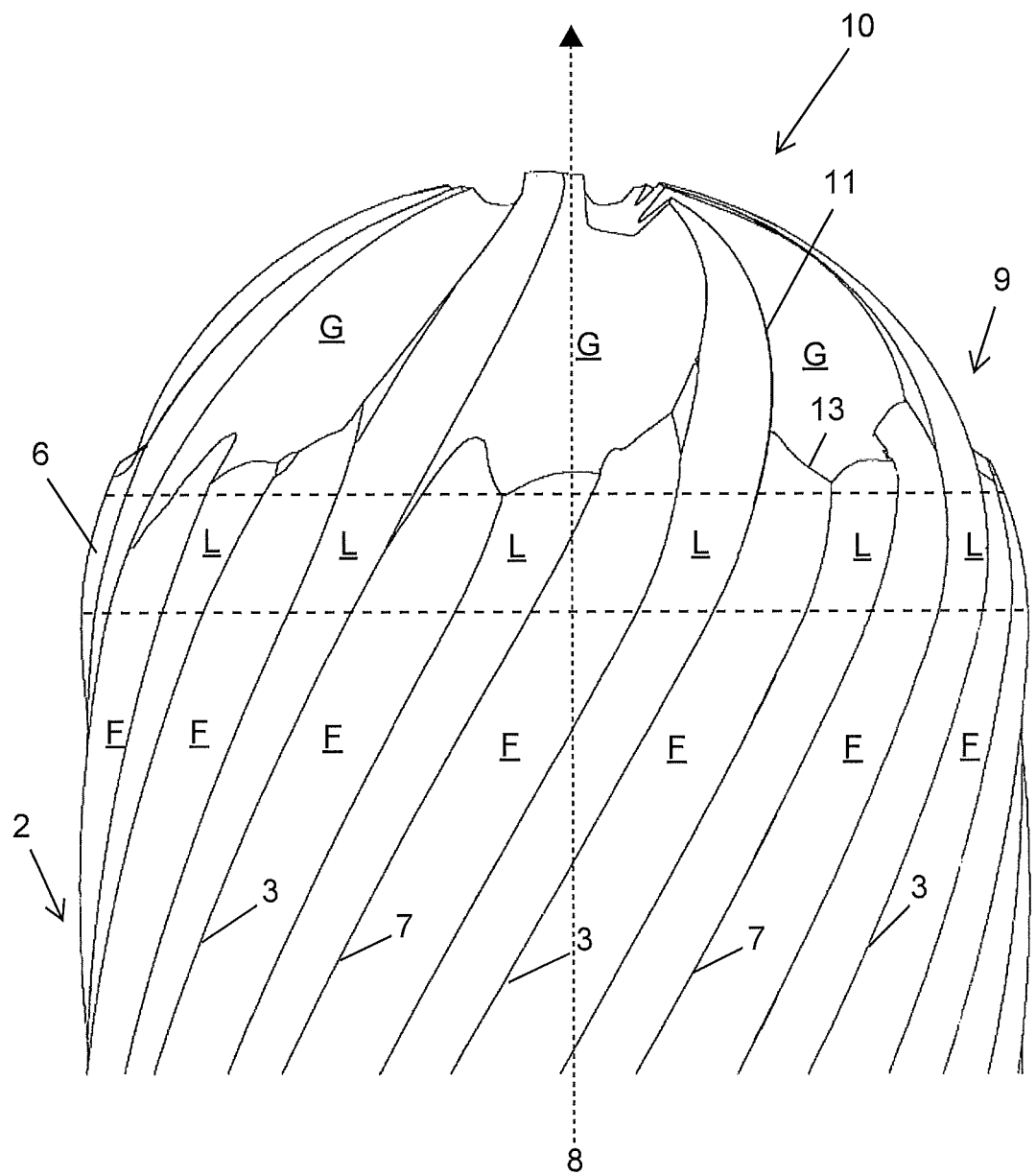
FIG. 1A is a perspective view from the side of a forward end of a ballnose end mill, according to one embodiment.

Broadly contemplated herein, in accordance with at least one embodiment, is a multi-flute end mill configuration that maintains circumferential spacing between the rake surface and clearance surface adjoining two adjacent end face cutting edges, respectively, regardless of the number of flutes and the desired end face configuration.

A multi-flute end mill, according to embodiments, is configured with a reduced number of end face cutting edges relative to the number of peripheral cutting edges. In contrast to conventional configurations, wherein every peripheral cutting edge extends continuously to a corresponding end face cutting edge, a limited number of peripheral cutting edges (as broadly contemplated herein) terminate at a predetermined distance from a reference region of the end face (hereinafter "terminated peripheral edges"), while the remaining number of peripheral cutting edges extend continuously a corresponding end face cutting edge (hereinafter "extended peripheral edges"). The use of a reduced number of end face cutting edges relative to the number of peripheral cutting edges provides sufficient circumferential spacing between the rake surface and clearance surface adjoining two adjacent end face cutting edges, respectively, to ensure superior chip flow despite a relatively large number of peripheral cutting edges.

By virtue of the reduced number of end face cutting edges relative to the number of peripheral cutting edges, an end mill is afforded the capabilities of a large-diameter multi-flute tool to reduce machining time (via the large number of peripheral cutting edges), without being subjected to flute clogging (itself reduced as a result of the reduced number of end face cutting edges), while also providing a superior finish. The cutting head formed with the end face cutting edges is generally, but not necessarily, of a reduced diameter relative to the cylindrical cutting body.

An isolating surface is formed on the end face in such a way as to occupy space normally allocated for an end face cutting edge that would otherwise extend continuously to a corresponding peripheral cutting edge (i.e., if not terminated). One or more end face cutting edges are therefore eliminated via the presence of the isolating surface, thereby preventing contact between the clearance surfaces of adjacent end face cutting edges. A discontinuous surface adjoining the forward edge of each terminated peripheral edge extends abruptly to the isolating surface, resulting in the terminated peripheral edge becoming isolated from the end face, or from the reference region of the end face.

The terminated peripheral edges may alternate with the extended peripheral edges about a circumference of the end mill. Alternatively, the total number of terminated peripheral edges may be suitably less than the total number of extended peripheral edges.

Despite the presence of the aforementioned discontinuous surfaces, chips formed by the cutting action of the end face cutting edges are assured of being evacuated through the flutes associated with the extended peripheral edges without causing flute clogging. As such, a chip is formed by the sequential cutting action of a plurality of adjacent end face cutting edges, even though a discontinuous surface is interposed between, and separates, two of the adjacent end face cutting edges, until the end mill sufficiently rotates about its longitudinal axis (for example, a fraction of a complete rotation) to form the chip. The chip is then delivered through the flute adjoining the cutting edge from which the chip was severed. Due to the unique configuration of the end mill that is formed with one or more eliminated end face cutting edges, the chips may be formed with a non-uniform thickness. A first thickness results after the chip is cut by two adjacent cutting edges which are not separated by a discontinuous surface therebetween, and a second chip thickness greater than the first thickness may result after the chip is cut by two adjacent cutting edges which are separated by a discontinuous surface therebetween.

Many different types of multi-flute end mills may therefore be produced when terminated peripheral edges are employed, including "ballnose", "corner radius" and "chamfer" types, to reduce machining time without being subjected to flute clogging.

FIG. 1A illustrates a ballnose end mill 10 according to one embodiment, to demonstrate the presence of isolating surfaces that serve to eliminate corresponding end face cutting edges. Although the isolating surfaces are illustrated in conjunction with a ballnose end mill, it will be appreciated that they may be similarly configured with respect to any other embodiment described herein, mutatis mutandis.

Ballnose end mill 10 is configured with alternating extended peripheral edges 3 and terminated peripheral edges 7. The extended peripheral edges 3, together with each adjoining land L, curve forwardly at the schematically illustrated corner 6 (as defined axially between the parallel sets of dotted lines in the drawing, themselves merely provided for illustrative purposes) and extend across end face 9 (i.e., the portion of end mill 10 above corner 6) towards the longitudinal axis (dashed arrow 8) of end mill 10. Here, each extended peripheral edge 3 continuously extends to become (e.g., without a discrete transition) a corresponding end face cutting edge 11. A concave flute F, through which chips are rearwardly evacuated from the end face 9, circumferentially extends between the land L adjoining an extended peripheral edge 3 and the adjacent land L adjoining a terminated peripheral edge 7. Each flute F helically extends from the end face 9 along a generally axial direction of the end mill, such that each of the flutes F define a similar flute helix angle profile.

Extended peripheral edges 3 along with end face 9 cooperatively form a cutting head. Schematically illustrated corner 6 is a transitional region between the peripheral extremity of the generally cylindrical cutting body 2 which runs substantially parallel to the longitudinal axis 8 of end mill 10 and is defined by the peripheral cutting edges, and the forward curved end face 9. The curvature of end face 9, when collectively taking into account all end face cutting edges 11, may be defined as being hemispherical with a constant radius of curvature; however, an end face 9 with a changing radius of curvature is also within the scope of embodiments herein. Corner 6 can generally, but not necessarily, be configured with a radius of curvature that is different than that of end face 9.

The forward terminal end 13 of each flute F is a surface that smoothly interfaces with a gash G constituting the aforementioned isolating surface that serves to eliminate an end face cutting edge. Each gash G circumferentially extends from the rake face of an end face cutting edge 11 to a clearance surface of the land L adjoining an adjacent end face cutting edge, and has a circumferential dimension (perpendicular to longitudinal axis of the end mill) which is greater than the circumferential dimension of one or more flutes F. Peripheral edge 7 terminates, at a forward end thereof, due to the discontinuity at a gash-cutting edge interface, and therefore does not continue into the end face 9.

Figure 1B:
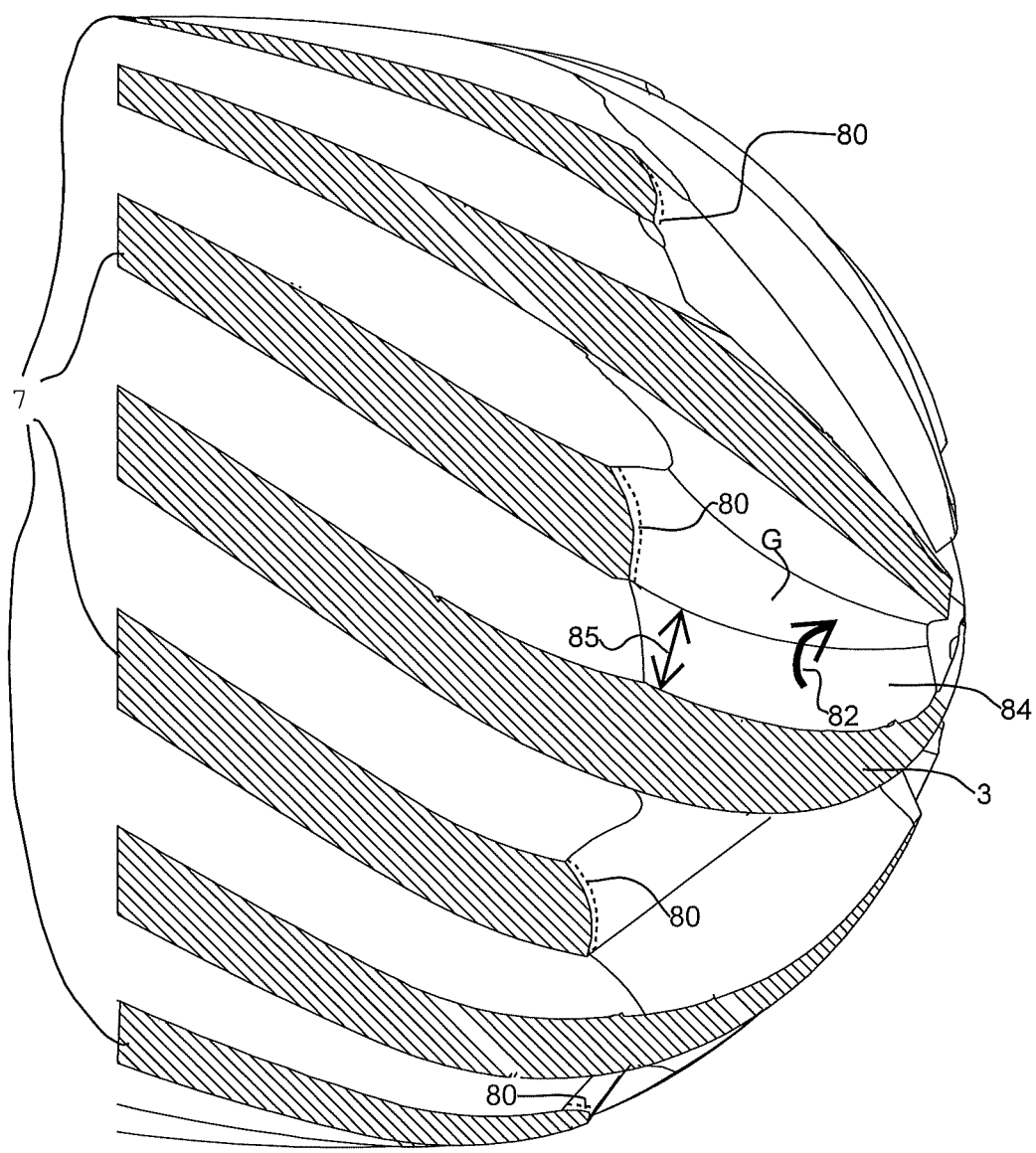
FIG. 1B is another view of the ballnose end mill of FIG. 1A.

FIG. 1B shows another view of the end mill of FIG. 1A. The circumferential extent of the terminal end 80 of a terminated peripheral cutting edge 7 is the same as that of the gash G at that particular point. Gash angle 82, i.e., that angle between gash G and side wall 84 of extended peripheral cutting edge 3, can be between 10 degrees and 60 degrees according to an embodiment. The minimum height of a side wall 84 of an extended peripheral cutting edge with respect to gash G (indicated by the double-headed arrow 85) is 0.10 mm, according to an embodiment.

It is noted that although a ballnose end mill is illustrated in FIGS. 1A-1B, the abovementioned properties (i.e. minimum latitudinal extent, gash angle and side wall height) can apply as well to chamfered end mills and corner-radius end mills, let alone other types of end mills not otherwise described or referred to herein.

Returning to FIG. 1A, gash G may be produced via a grinding wheel or via any other known arrangement for selective material removal. For example, the gash G may be produced by any one of the following three methods: (1) combined motion of advancing a grinding wheel into contact with the end face and simultaneously rotating the end mill, (2) advancing a first grinding wheel into contact with the end face, retracting the first grinding wheel, and then advancing a second grinding wheel of an increased thickness to the same or an adjacent location of the end face, or (3) advancing the grinding wheel into contact with the end face and then selectively rotating the grinding wheel.

Figure 3:
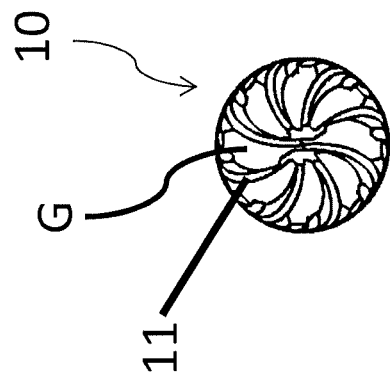
FIG. 3 is a front view of the ballnose end mill of FIG. 1A.
Figure 2:
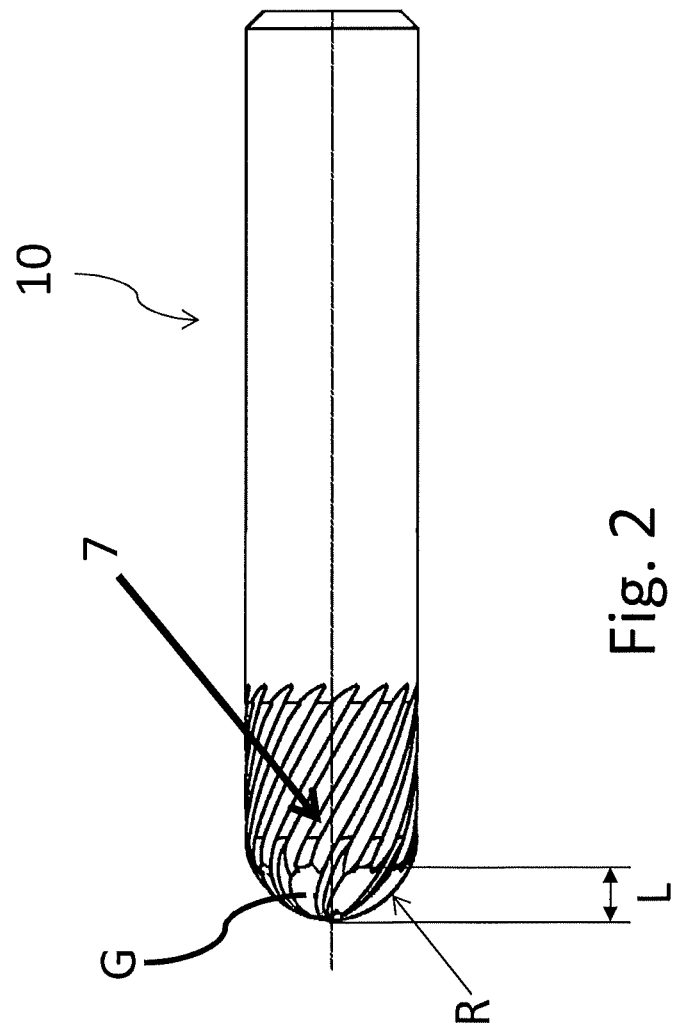
FIG. 2 is a side view of the ballnose end mill of FIG. 1A.

FIG. 2 is a side view of a ballnose end mill 10 and FIG. 3 is a front view thereof, illustrating the gashes G substantially as described heretofore. Preferably, the minimum number of end face cutting edges 11 is two, and the maximum number (thereof) is three less than the number of terminated peripheral cutting edges 7, for a given tool diameter and for a given ballnose radius R. It can be appreciated that, in such a context, a conventional multi-flute tool having an equal number of peripheral cutting edges and end face cutting edges would be infeasible.

For example, a conventional ballnose end mill could have up to 6 teeth for a tool diameter of 10 mm and a ballnose radius of 5 mm; however, the provision of 8 teeth there would cause clearance surfaces of adjacent end face cutting edges to contact each other and to thereby limit chip evacuation. In contrast, a ballnose end mill as broadly contemplated herein can operate effectively for a tool diameter of 10 mm and a ballnose radius of 5 mm when there are 8 peripheral cutting edges and 5 end face cutting edges.

As another example, a prior art ballnose end mill can have up to 10 teeth for a tool diameter of 16 mm and a ballnose radius of 8 mm; however, the provision of 16 teeth there would be infeasible. In contrast, a ballnose end mill as broadly contemplated herein can operate effectively for a tool diameter of 16 mm and a ballnose radius of 8 mm when there are 16 peripheral cutting edges and 13 end face cutting edges.

According to an embodiment, the maximum axial length L of the gashes G may be R+1 mm, and the minimum value may be equal to R−(R*0.6) mm.

FIG. 4 is a side view of a chamfered end mill 20 and FIG. 5 is a front view thereof, illustrating gashes G analogous to those described heretofore. Preferably, the minimum number of end face cutting edges 11 is two, and the maximum number (thereof) is three less than the number of terminated peripheral cutting edges 7, for a given tool diameter and for a given chamfer length CH. It can be appreciated that, in such a context, a conventional multi-flute tool having an equal number of peripheral cutting edges and end face cutting edges would be infeasible.

According to an embodiment, the maximum axial length L of the gashes G may be CH+1 mm, and the minimum value may be equal to CH−(CH*0.6) mm.

Figure 7:
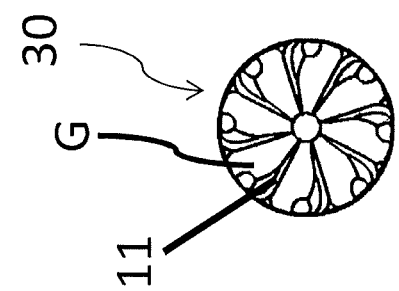
FIG. 7 is a front view of the corner-radius end mill of FIG. 6.
Figure 6:
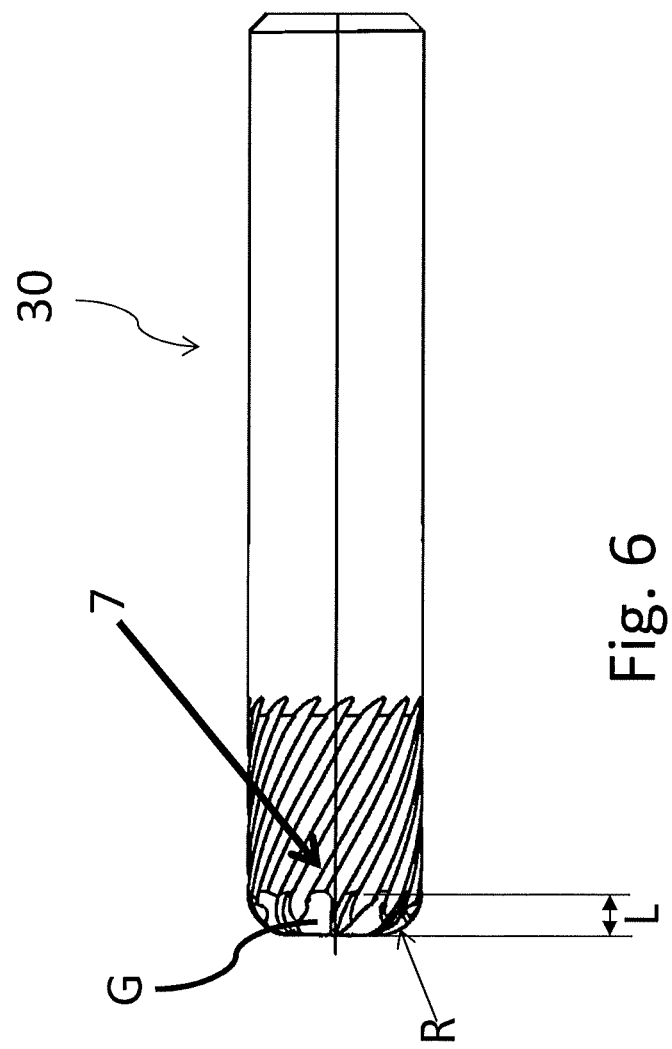
FIG. 6 is a side view of a corner-radius end mill, according to one embodiment.

FIG. 6 is a side view of a corner-radius end mill 30 and FIG. 7 is a front view thereof, illustrating the gashes G analogous to those described heretofore. Preferably, the minimum number of end face cutting edges 11 is two, and the maximum number (thereof) is three less than the number of terminated peripheral cutting edges 7, for a given tool diameter and for a given corner radial dimension R. It can be appreciated that, in such a context, a conventional multi-flute tool having an equal number of peripheral cutting edges and end face cutting edges is infeasible.

According to an embodiment, the maximum axial length L of the gashes G may be R+1 mm, and the minimum value may be equal to R−(R*0.6) mm.

It is to be noted that end mills as broadly contemplated herein can be suitable for deep and high-speed slotting due to a structural relationship between the end face cutting edges and the peripheral cutting edges, and due to similarities in their cutting operation. This contrasts; for instance, with tools comprising burr-style peripheral edges (such as the CBDB commercial router available by Kennametal®) which are suitable for grinding a substance. In light of the aforesaid, it can be appreciated that embodiments herein relate to an end mill, wherein cutting operations of the peripheral and end face sections essentially correspond to each other, as opposed to burr-style tools in which operations of the end face section serve a boring function in preparation for grinding operations of the peripheral section.

While some embodiments have been described by way of illustration, it will be apparent that embodiments can be carried out with many modifications, variations and adaptations, and with the use of numerous equivalents or alternative solutions that are within the scope of persons skilled in the art, without exceeding the scope of the claims.

The invention claimed is:

1. A multi-flute end mill, comprising:
an end face;
a plurality of flutes extending helically from the end face along a generally axial direction of the end mill, wherein each flute defines a similar flute helix angle profile;
a plurality of peripheral cutting edges, each adjoining a corresponding one of the helical flutes, wherein two or more of the plurality of peripheral cutting edges comprise extended peripheral edges that continuously extend to become a corresponding end face cutting edge terminating at the end face, and wherein two or more of the peripheral cutting edges are terminated peripheral edges terminating at a predetermined axial distance from the end face; and
a gash interposed between a forward end of each of the terminated peripheral edges and the end face, wherein each gash extends circumferentially from one end face cutting edge to a land adjoining an adjacent end face cutting edge, and wherein each gash has a circumferential dimension, perpendicular to a longitudinal axis of the end mill, which is greater than a circumferential dimension of one or more of the plurality of flutes.

2. The multi-flute end mill according to claim 1, wherein the end mill is a ballnose end mill that comprises a cutting head.

3. The multi-flute end mill according to claim 2, wherein each of the gashes has a minimum axial length equal to the product of 0.4 and a radius of the ballnose cutting head.

4. The multi-flute end mill according to claim 2, wherein each of the gashes has a maximum axial length that is greater than the radius of the ballnose cutting head.

5. The multi-flute end mill according to claim 1, wherein the end mill is a chamfered end mill that comprises a chamfered cutting head.

6. The multi-flute end mill according to claim 5, wherein each of the gashes has a minimum axial length equal to the product of 0.4 and a chamfer length of the chamfered cutting head.

7. The multi-flute end mill according to claim 5, wherein each of the gashes has a maximum axial length greater than the chamfer length of the chamfered cutting head.

8. The multi-flute end mill according to claim 1, wherein the end mill is a corner-radius end mill that comprises a corner-radius cutting head.

9. The multi-flute end mill according to claim 8, wherein each of the gashes has a minimum axial length equal to the product of 0.4 and a corner radial dimension of the corner-radius cutting head.

10. The multi-flute end mill according to claim 8, wherein each of the gashes has a maximum axial length greater than the corner radial dimension of the corner-radius cutting head.

11. The multi-flute end mill according to claim 1, wherein each of the gashes has a gash angle of between 10 and 60 degrees.

12. The multi-flute end mill according to claim 11, wherein a minimum height of a side wall of each of the limited number of peripheral extended cutting edges, with respect to a corresponding one of the gashes is 0.10 mm.

* * * * *